Nov. 18, 1952          O. G. SINGER          2,618,492
ANTISKID DEVICE FOR AUTOMOTIVE VEHICLES
Filed March 4, 1950          2 SHEETS—SHEET 1
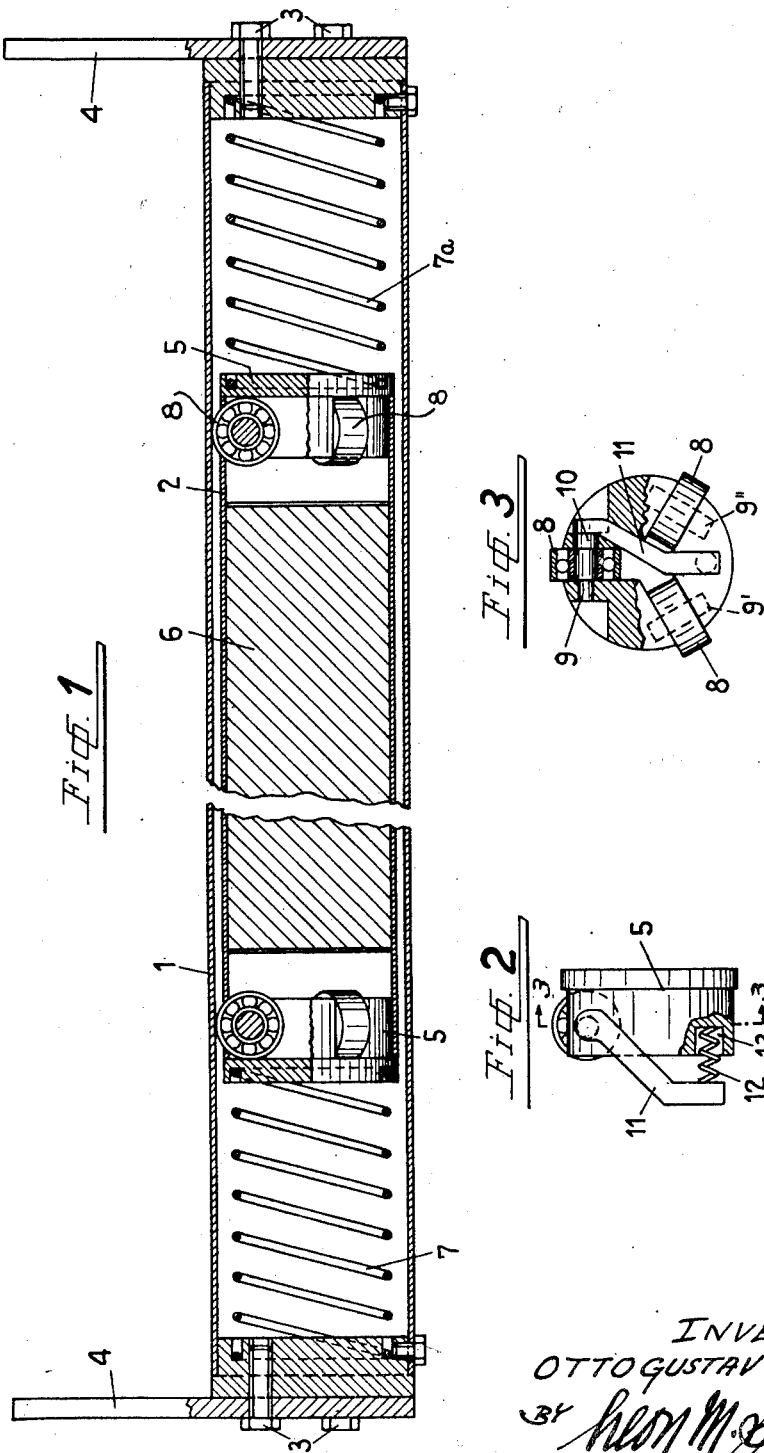
INVENTOR:
OTTO GUSTAV SINGER Nov. 18, 1952     O. G. SINGER     2,618,492
ANTISKID DEVICE FOR AUTOMOTIVE VEHICLES
Filed March 4, 1950     2 SHEETS—SHEET 2
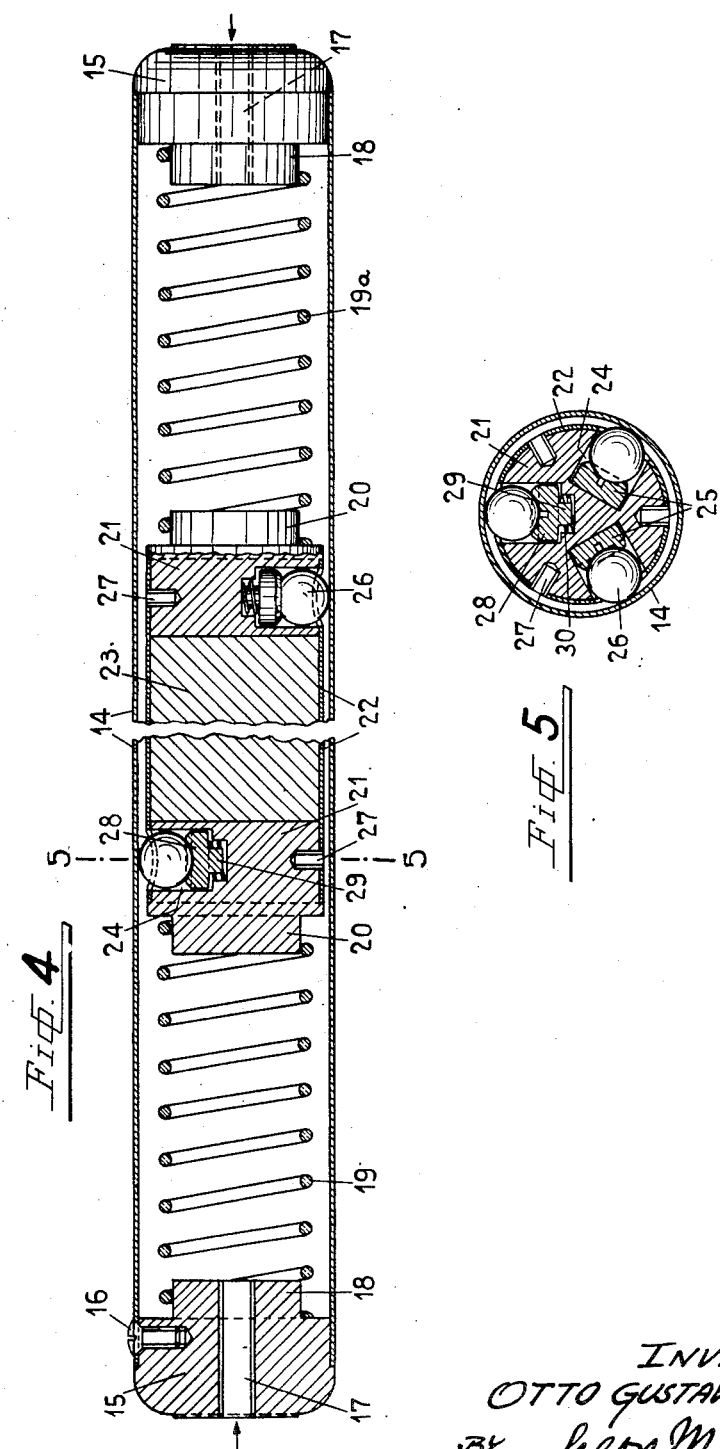
INVENTOR:
OTTO GUSTAV SINGER
BY Patented Nov. 18, 1952

2,618,492

UNITED STATES PATENT OFFICE 2,618,492

ANTISKID DEVICE FOR AUTOMOTIVE VEHICLES

Otto Gustav Singer, Zurich, Switzerland

Application March 4, 1950, Serial No. 147,694
In Switzerland October 18, 1949

2 Claims. (Cl. 280—150)

The present invention refers to an anti-skid device for automotive vehicles. This device has as one of its primary characteristics that at least one mass of inertia is displaceably arranged in guiding means mounted parallel to the rear axle of the vehicle and is supported by elastic members, said mass of inertia being mounted in said guiding means which is preferably of tubular shape by means of roller elements.

By way of example an embodiment of the present invention is illustrated in the drawing accompanying and forming part of this specification in which:

Fig. 1 shows a longitudinal section through the anti-skid device,

Fig. 2 illustrates the arrangement of the roller elements in side view and partly in section, respectively, and Fig. 3 is a cross-section along line 3—3 in Fig. 2, Fig. 4 is a longitudinal section through an anti-skid device according to a modified embodiment of the present invention, Fig. 5 is a cross-section along line 5—5 in Fig. 4.

The anti-skid device illustrated has a horizontal tube 1 arranged transversely to the longitudinal axis of the automotive vehicles and is detachably secured at either end by means of screws 3 to brackets 4 rigidly mounted on said automotive vehicle. The tube 1 serves as a guiding means for a mass of inertia, said mass of inertia consisting of a piece of tube 2 closed at either end by a socket 5. The tube 2 is at least partly filled with a weight or load 6, by way of example, of lead. The piece of tube 2 is under the operative influence of compression springs 7, 7a said compression springs having the tendency to keep said mass of inertia symmetrically as regards the longitudinal central plane.

The two sockets 5 serve as mountings for three roller elements 8, each of said roller elements being mounted equally spaced around the circumference of the socket 5 for rotation on the pins 9, 9' and 9'' in such a manner that the roller surfaces of said roller elements bear against the inside surface of said guiding tube 1. At either end at least one of the rollers 8 is elastically mounted to give or recede (Figs. 2 and 3). For this purpose the pin 9, by way of example, is at one end in connection with an eccentric 10 carrying a lever 11. The other end of the lever 11 away from said eccentric 10 is under the operative influence of a spring 12, said spring being located in a recess 13 of the socket 5. The whole assembly is carried out in such a manner that a force acting radially on the roller elements causes a rotary movement of the eccentric 10 against the action of the spring 12 in such a manner that the roller element 8 is radially displaced. As soon as said force ceases to act, said roller element again takes up its original position due to the action of the spring 12. Thus, the roller device is enabled to follow any unevenness possibly existing along the inner surface of tube element 1.

The anti-skid device as shown in Figs. 4 and 5 has a horizontal guide tube 14, the ends of which are closed at either side by a socket 15. The sockets 15 are fixed to the tube 14 by means of the bolts 16. The sockets 15 have axial borings 17 with internal threads by the use of which the device can be attached to the frame of the vehicle. Each socket 15 has at its inner wall a projection 18 upon which a pressure spring 19 is located the other end of which is located in the same way at a projection 20 of a socket 21. Either socket 21 forms the end part of a tube 22 with the lead weight or load 23 similar to weight 6 of Fig. 1. They are fixedly attached at 27 to the tube 22. Said springs 19, 19a have the tendency to hold said lead filled tube 22 in the middle part of tube 14.

In the tube 22 as well as in the sockets 21, in a common radial plane and under an angle of 120° respectively there are arranged three radial recesses 24. At the bottom of two of said recesses there are located sockets 25 made of brass, which serve as a seat for the balls 26 bearing against the inside surface of said tube 14.

The third one of said balls is seated in a socket 28 having a radially extending projection 29 surrounded by a spiral spring 30. The spiral spring 30 bears against the bottom of said recess and has the tendency to press the socket 28 together with the ball against the inside surface of said tube 14. Thereby said roller device is able to follow elastically any eventual inequalities or unevenness of the inside surface of tube 14. The arrangement is such, that the yieldingly mounted balls are located on either side of the longitudinal axis of the tubes and in a common central plane of tube 22 (Fig. 4).

It is to be understood that the present invention is not limited to the exact execution as it is shown and described herewith, but that various alterations and modifications can be made without narrowing the scope of the invention. Instead of the springs 7 other elastic members, such as rubber buffers, can be provided. Furthermore it is also possible to provide several masses of inertia with a plurality of roll elements in the guiding tube means.

The device described has the advantage of simplicity and of an exceptionally rapid capacity of reaction.

Having thus described the invention, what is claimed as new and desired to be secured by Letters Patent, is:

1. An anti-skid device for automotive vehicles comprising a cylindrical tube having an inner wall and extending in substantially parallel relation to the rear axle of the vehicle, at least one mass of inertia arranged for parallel displacement within said tube and lengthwise of said inner wall, oppositely disposed springs supporting said mass at either end thereof within said tube, and a plurality of roll elements arranged for contact with the inner wall of said tube and equally spaced from each other about the circumference of and recessed in said mass of inertia adjacent either end thereof, at least one of said roll elements being elastically mounted to give in radial direction of said inner wall, and means between said roll elements and said springs for anchoring one end of each spring at the respective end of said mass of inertia.

2. An anti-skid device for automotive vehicles comprising a cylindrical tube extending parallel to the rear axle of the vehicle, at least one mass of inertia terminating in opposite ends and arranged in said cylindrical tube for substantially parallel displacement in relation to the rear axle, said mass of inertia being springedly supported at either end thereof, a plurality of roll elements arranged at either end of said mass and equally spaced about the circumference of the latter, at least one of said roll elements being elastically mounted to give radially with respect to the axis of said tube and having a rolling surface bearing against the inner surface of said tube, and means adapted, respectively, to eccentrically move said one roll element for contact with and to space said roll element from the inner surface of said tube, said means including a spring supported member connected to said roll element.

OTTO GUSTAV SINGER.

REFERENCES CITED

The following references are of record in the file of this patent:

UNITED STATES PATENTS

| Number | Name | Date |
|---|---|---|
| 1,954,409 | Hanel | Apr. 10, 1934 |
| 2,155,130 | Hanel | Apr. 18, 1939 |
| 2,471,233 | Monson | May 24, 1949 |

FOREIGN PATENTS

| Number | Country | Date |
|---|---|---|
| 228,799 | Switzerland | Dec. 1, 1943 |